(12) United States Patent
Ma et al.

(10) Patent No.: US 8,072,741 B2
(45) Date of Patent: Dec. 6, 2011

(54) MOBILE DEVICE SHUTTER DOOR

(75) Inventors: Yawei Ma, San Diego, CA (US); Ichiro Yamada, San Carlos, CA (US); Hong Zuo, Sunnyvale, CA (US)

(73) Assignee: Sony Ericsson Mobile Communications AB, Lund (SE)

( * ) Notice: Subject to any disclaimer, the term of this patent is extended or adjusted under 35 U.S.C. 154(b) by 225 days.

(21) Appl. No.: 12/603,768

(22) Filed: Oct. 22, 2009

(65) Prior Publication Data
US 2011/0096471 A1 Apr. 28, 2011

(51) Int. Cl.
*G06F 1/16* (2006.01)

(52) U.S. Cl. ............. 361/679.01; 455/566; 439/660; 340/572.1; 345/520

(58) Field of Classification Search ............. 455/575.1, 455/575.4, 566, 411, 517, 423, 456.1, 410, 455/41.1; 312/334.1; 361/679.01, 679.2, 361/679.41, 679.02, 679.08, 679.21; 439/55, 439/39, 660, 626; 701/209, 207, 2, 36, 213, 701/41; 340/568.1, 5.61, 426.18, 8.1, 572.1, 340/10.1, 425.5; 345/168, 173, 581, 520, 345/163
See application file for complete search history.

(56) References Cited

U.S. PATENT DOCUMENTS

| | | | |
|---|---|---|---|
| 2009/0137294 A1 | 5/2009 | Chen | |
| 2009/0146537 A1 | 6/2009 | Wang | |
| 2010/0240425 A1* | 9/2010 | Madsen et al. | 455/575.4 |
| 2010/0273542 A1* | 10/2010 | Holman et al. | 455/575.4 |
| 2011/0053659 A1* | 3/2011 | Murphy | 455/575.1 |

FOREIGN PATENT DOCUMENTS

EP 2106100 A2 9/2009

OTHER PUBLICATIONS

International Search Report; Dec. 17, 2010; issued in International Patent Application No. PCT/US2010/049754.
Written Opinion of the International Searching Authority; Dec. 17, 2010; issued in International Patent Application No. PCT/US2010/049754.

* cited by examiner

*Primary Examiner* — Hung Duong
(74) *Attorney, Agent, or Firm* — Patrick B. Horne; Moore & Van Allen, PLLC

(57) ABSTRACT

A mobile device has a first portion and a second portion. The first portion includes a body and a first magnet member. The second portion may be movably connected with the first portion and includes a body, a shutter door and a second magnet member. An opening is defined in the body of the second portion and the shutter door is operable to move from an open position to a closed position to cover at least a portion of the opening when the shutter door. The second magnet member is connected to the shutter door so that, when the second magnet member is aligned with the first magnet member, the shutter door is positioned in the closed position.

20 Claims, 10 Drawing Sheets

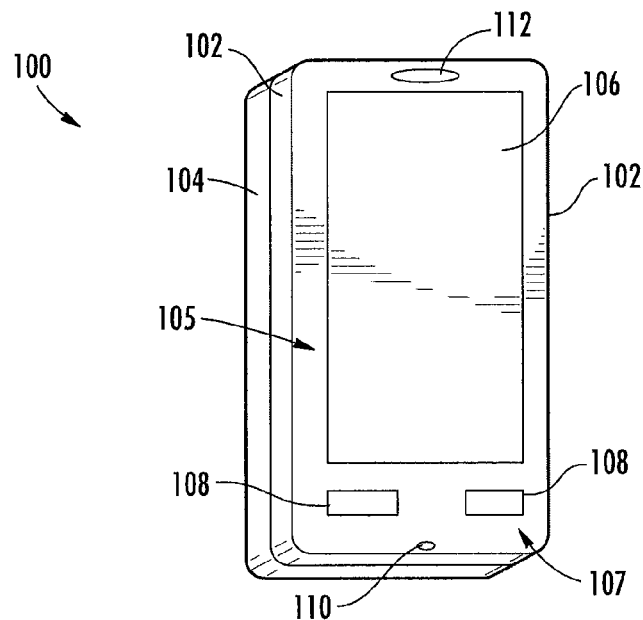
FIG. 1A
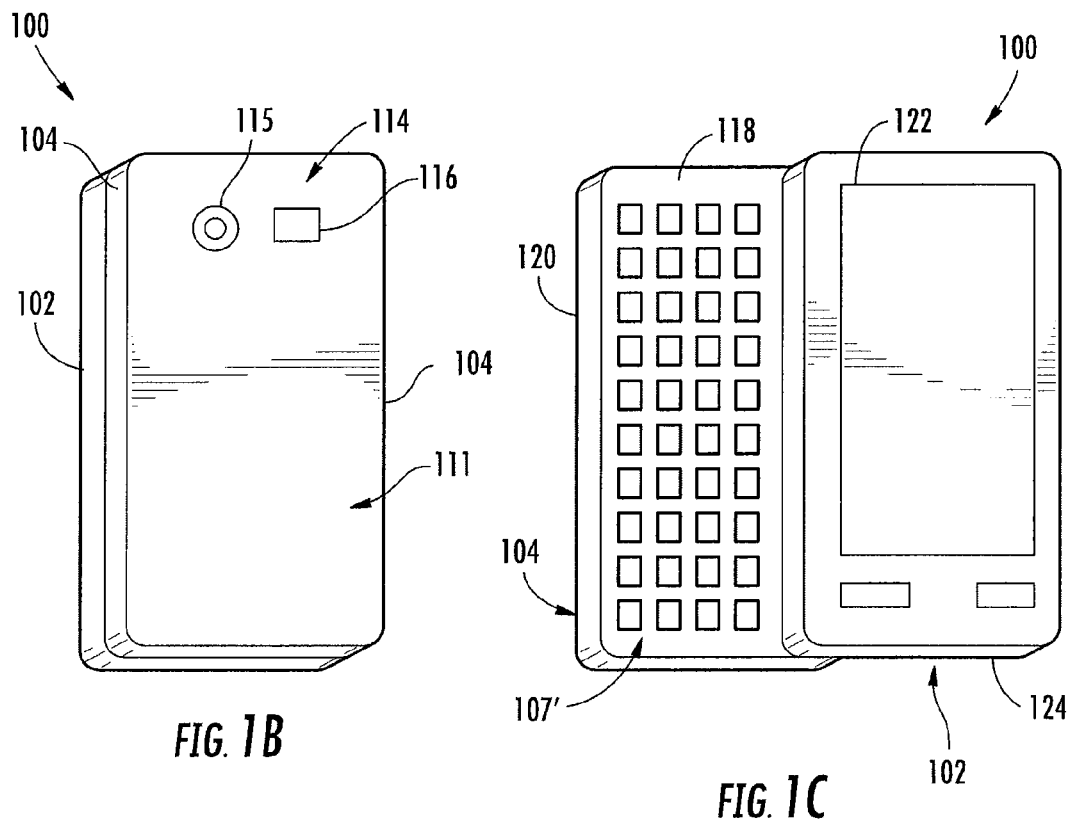
FIG. 1B
FIG. 1C

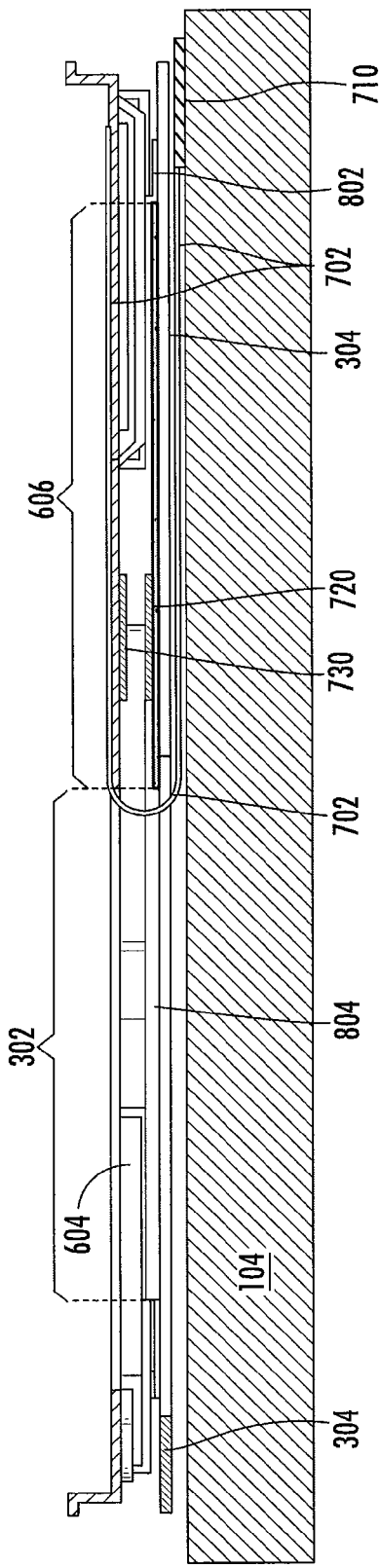
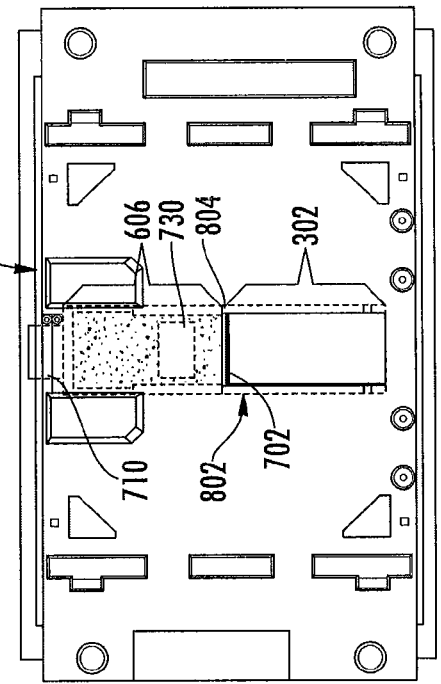
FIG. 9A
FIG. 9B

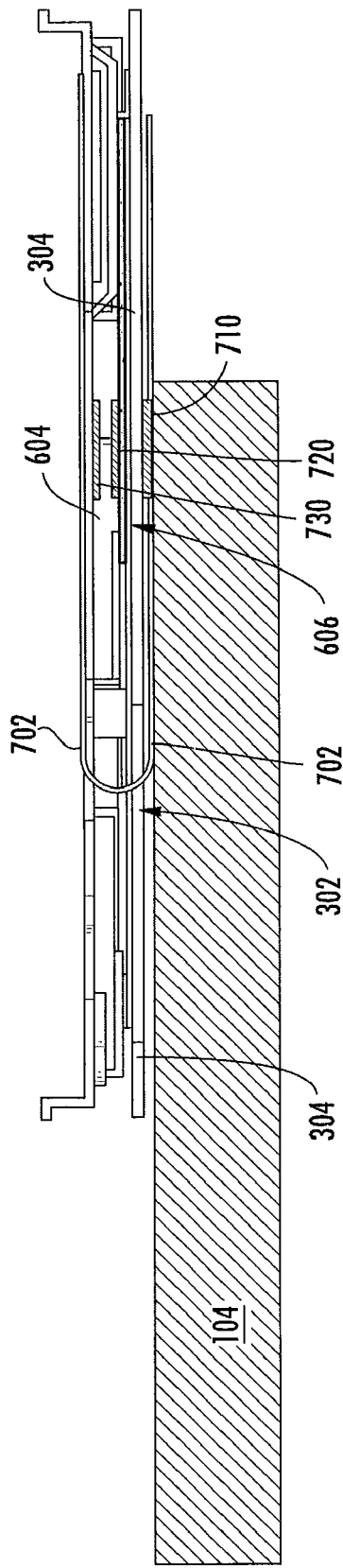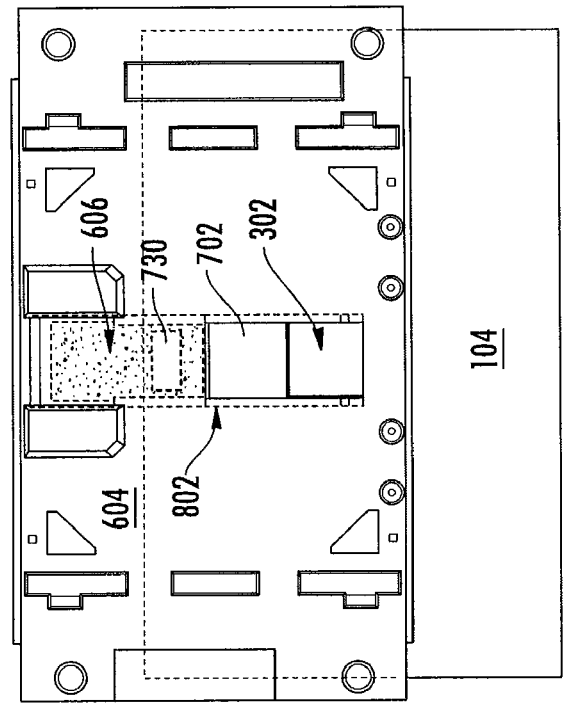
FIG. 10A
FIG. 10B

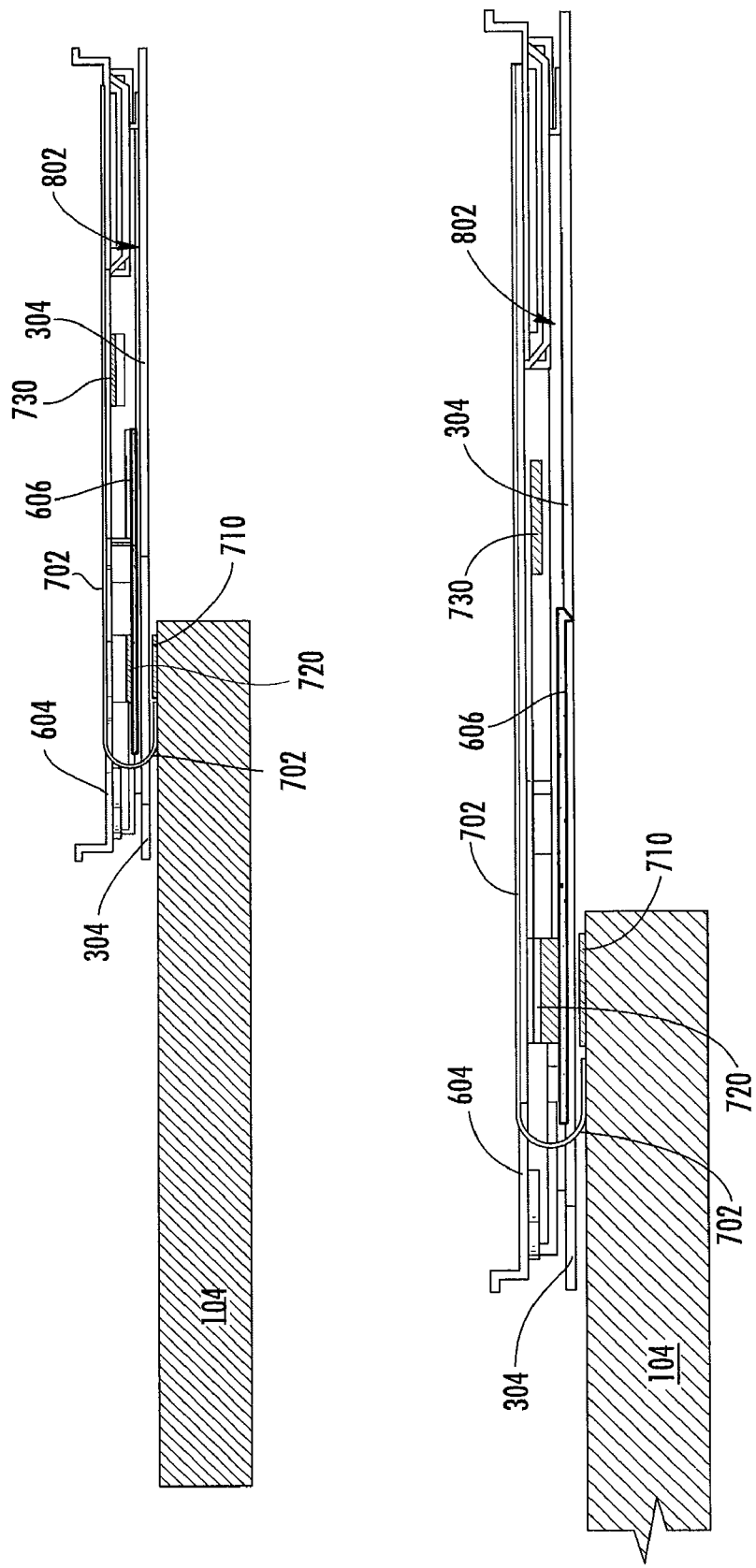

MOBILE DEVICE SHUTTER DOOR

FIELD

Embodiments of the present invention relate to mobile devices, and more particularly to mobile communication devices.

BACKGROUND

Current functionality of mobile devices, such as a mobile communication device, are limited due to designers attempting to conceal aesthetically-unpleasing aspects of the mobile devices. Additionally, the parts required for current mobile devices are not optimally designed in order to minimize the thickness of the mobile devices.

It is, thus, desired to maximize functionality of mobile devices while increasing the aesthetic value thereof. It is also desired to minimize the thickness of the mobile devices, and, thus, minimizing material costs and improving the design and weight of the mobile device.

SUMMARY OF THE INVENTION

In accordance with an embodiment of the present invention, a mobile device has a first portion and a second portion. The first portion includes a body and a first magnet member. The second portion may be movably connected with the first portion and includes a body, a shutter door and a second magnet member. An opening is defined in the body of the second portion and the shutter door is operable to move from an open position to a closed position so that the shutter door covers at least a portion of the opening when the shutter door is in the closed position. The second magnet member may be connected to the shutter door so that, when the second magnet member is aligned with the first magnet member, the shutter door is positioned in the closed position.

In accordance with another embodiment of the present invention, a mobile device includes a first portion and a second portion. The first portion includes a body and a first magnet member. The second portion is connected with the first portion and includes a housing, a shutter door, and a second magnet member. The housing has an opening and the shutter door is operable to move from an open position to a closed position so that the shutter door covers at least a portion of the opening when the shutter door is in the closed position. The second magnet member is magnetically attracted to the first magnet member when the shutter door is in the closed position.

In accordance with another embodiment of the present invention, a method includes providing a mobile device. The mobile device includes a first portion and a second portion. The first portion includes a body and a first magnet member. The second portion includes a body, a shutter door, and a second magnet member. An opening is included in the body of the second portion. The method further includes moving the second portion from a first position to a second position relative to the first portion so that the shutter door moves from an open position to a closed position to cover at least a portion of the opening, the closed position being defined by the alignment of the first magnet member and second magnet member.

Other embodiments, aspects and features of the present invention, as defined solely by the claims, will become apparent to those ordinarily skilled in the art upon review of the following non-limited detailed description of the invention in conjunction with the accompanying figures.

BRIEF DESCRIPTION OF THE DRAWINGS

FIG. 1A is a front perspective view of an example of a mobile device in accordance with an embodiment of the present invention.

FIG. 1B is a back perspective view of the mobile device of FIG. 1A.

FIG. 1C is a front perspective view of the mobile device of FIG. 1A when the mobile device is open.

FIG. 9A is a side perspective view of a portion the mobile device of FIG. 7 where the mobile device is in a closed position and the shutter door is in an open position.

FIG. 9B is front perspective view of the mobile device of FIG. 9A.

FIG. 10A is a side perspective view of a portion the mobile device of FIG. 7 where the mobile device is being opened (partly opened) and the shutter door is in an open position.

FIG. 10B is front perspective view of the mobile device of FIG. 10A.

FIG. 11A is a side perspective view of a portion the mobile device of FIG. 7 where the mobile device is in a fully opened position.

DETAILED DESCRIPTION OF EMBODIMENTS OF THE INVENTION

Figure 2:
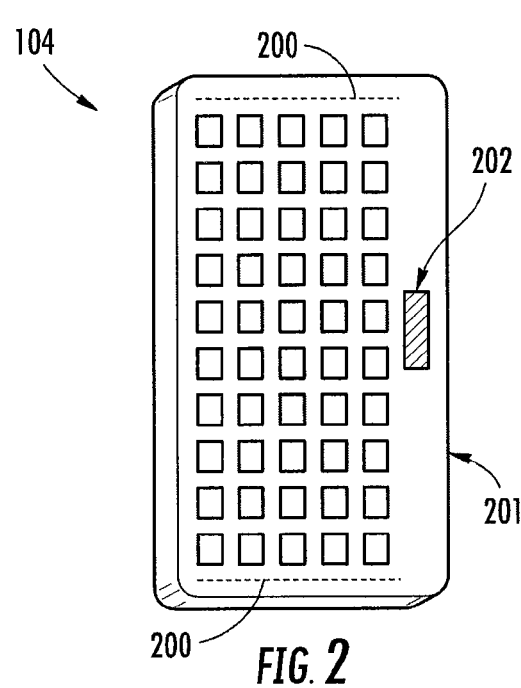
FIG. 2 is a front perspective view of a bottom or first portion of the mobile device of FIG. 1A.

The following detailed description of embodiments refers to the accompanying drawings, which illustrate specific embodiments of the invention. Other embodiments having different structures and operations do not depart from the scope of the present invention.

As will be appreciated by one of skill in the art, embodiments of the present invention may be embodied as methods, systems, apparatuses and devices. Exemplary embodiments of the present invention are described below with reference to illustrations and/or flowchart of methods, apparatus (systems) and devices according to embodiments of the invention.

It will be understood that each block of the flowchart illustrations and combinations of blocks in the flowchart illustrations can be implemented either sequentially or simultaneously, and the present invention should not be limited to the order of blocks presented.

FIG. 1A is a front perspective view of an example of a mobile device 100 in accordance with one embodiment of the present invention. The mobile device 100 may be any mobile device, such as a cellular telecommunications device (e.g., a mobile telephone), a personal digital assistant (PDA), a cordless telephone, a computing device, a portable game system, a portable audio system, a portable video system, any non-computing or non-electronics device, and any other mechanical device which may employ a movable shutter door. The mobile device 100 illustrated in FIG. 1A is a mobile cellular telephone and is for purposes of solely illustrating some embodiments of the present invention. Thus, various embodiments of the present invention are not limited by these embodiments but may include any other embodiments within the scope of the present invention.

The mobile device 100 may include a top portion 102 and a bottom portion 104. In one embodiment, the top portion 102 forms the front half of the mobile device 100 while the bottom portion forms the back half of the mobile device 100.

The top portion 102 of the mobile device 100 may include a user interface 105 to facilitate controlling operation of the communications device 100, including, for example, initiating and conducting phone calls, playing games, playing music, operating a camera, navigating the Internet, controlling other software or hardware operations, etc. The user interface 105 may include a display 106 to provide visual signals to a user as to the status and operation of the communications device 100. The display 106 may be a liquid crystal display (LCD), for example, capable of presenting images. The display 106 may provide information to a user or operator in the form of images, text, numerals, characters, graphic user interface (GUI) and the like. The user interface 105 may also include a keypad 107 which may include a series of keys 108. The keypad 107 may include function keys or buttons including a point device, such as a trackball, joystick or the like, in order to permit the user to communicate commands through the mobile device 100, such as, for example, playing games, dialing phone numbers, initiating and terminating calls, establishing other communications and the like. In one embodiment, an additional keypad 107' may also be presented on the bottom portion 104, as illustrated in FIG. 1C. This allows some space to be freed so that the display 106 may be larger or the freed spaced may be used for other purposes. Nonetheless, the keypad 107, 107' may also be used to control other operations of the mobile device 100, such as accessing the Internet, sending and receiving email and/or text messages, operating a camera, playing music, viewing video, etc.

The mobile device 100 may also include a microphone 110 and a speaker 112. Features of the user interface 105 other than those described herein may also be included in the user interface 105. It should be noted that all of the features of the user interface 105 may be integrated on the top portion 102 of the mobile device 100. In addition, one or more features of the user interface 105 may be integrated in the bottom portion 104 of the mobile device 100.

FIG. 1B is a back perspective view of the mobile device 100 of FIG. 1A. As shown in FIG. 1B, the mobile device 100 may include a camera 114. The camera 114 may include a lens 115 and a flash 116 for taking pictures and/or videos. As illustrated, the camera 114 may be integrated into the bottom portion 104 of the mobile device 100. The camera 114 may controlled through the user interface 105.

FIG. 1C is a front perspective view of the mobile device 100 of FIG. 1A when the mobile device 100 is in an opened position. As illustrated, the top portion 102 may be moved or slid in a linear fashion relative to the bottom portion 104. This allows for an additional keypad 107' to be utilized by the user.

As illustrated in FIGS. 1-3, the bottom portion 104 may have a front face 118 and a back face 120 and the top portion 102 may have a front face 122 and a back face 124. When fully assembled, the back face 124 of top portion 102 may be adjacent to the front face 118 of the bottom portion 104. Additionally, the back face 120 of the bottom portion 104 may be the back face of the mobile device 100, while the front face 122 of the top portion 102 may be the front face of the mobile device 100. The front face 118 of the bottom portion 104 defines a first plane (not shown) which is parallel to a second plane (not shown) defined by the back face 124 of the top portion 102. The back face 124 of the top portion 102 may be configured to slide along the second plane.

Figure 3A:
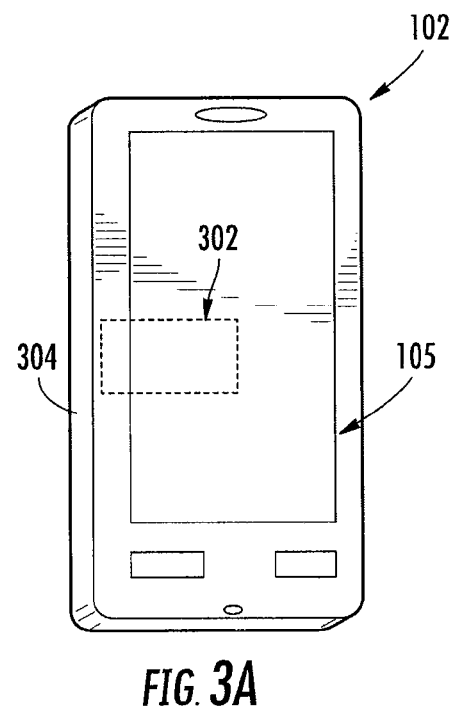
FIG. 3A is a front perspective view of a top or second portion of the mobile device of FIG. 1A.
Figure 3B:
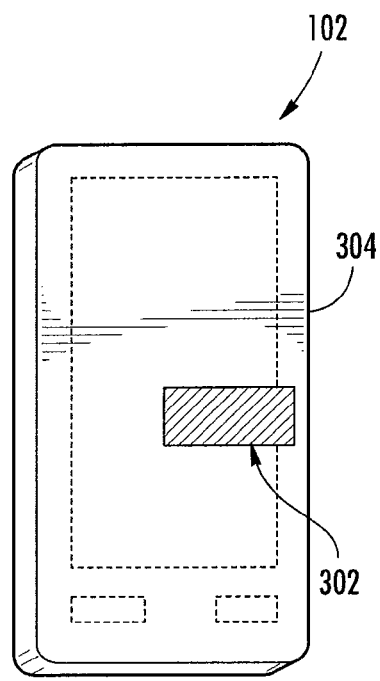
FIG. 3B is a back perspective view of the top portion of the mobile device of FIG. 3A.
Figure 4A:
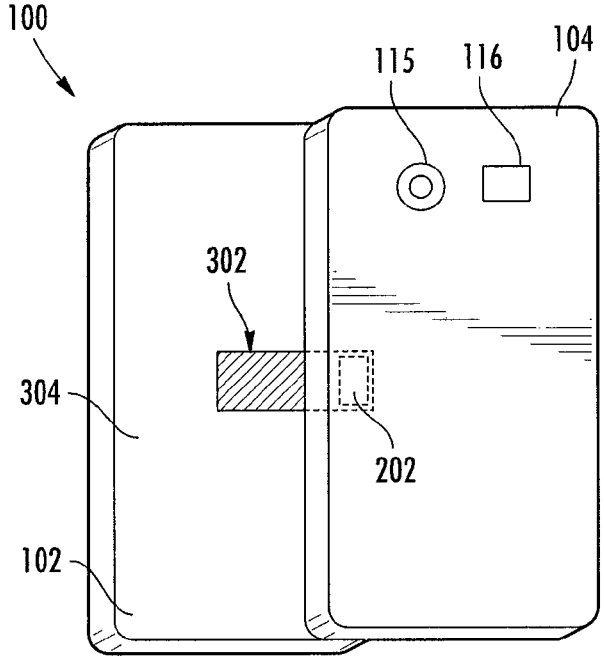
FIG. 4A is a back perspective view of the mobile device of FIG. 1C when the mobile device is open.
Figure 4B:
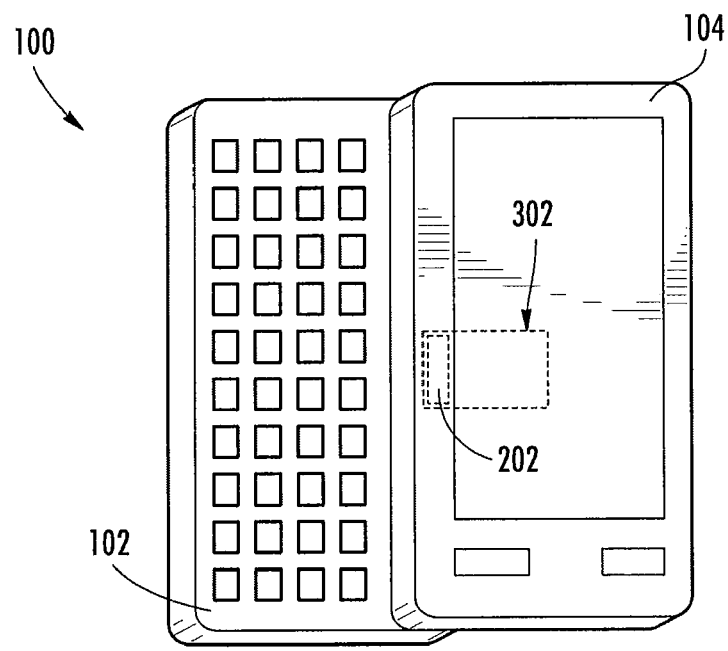
FIG. 4B is a front perspective view of the mobile device of FIG. 1C when the mobile device is open and illustrating an opening in the top or second portion.

FIGS. 2, 3A, 3B, 4A and 4B show various views of the mobile device 100. FIGS. 2 and 3A are front perspective views of the bottom portion 104 and top portion 102, respectively, of the mobile device 100 of FIG. 1A. FIG. 3B is a back perspective view of the top portion 102 of the mobile device 100 of FIGS. 3A. FIGS. 4A and 4B illustrate a back perspective view and front perspective view, respectively, of the mobile device 100 of FIG. 1C when the mobile device is in the opened position. As shown in FIGS. 2 and 3, the top portion 102 and the bottom portion 104 are separate parts, which when connected or integrated together form the mobile device 100. The connection of the top portion 102 and the bottom portion 104 may be any mechanical means to allow the top portion 102 to move relative to the bottom portion 104. For example, FIG. 2 illustrates the mechanical means is two tracks 200 which allows the top portion 102 to slide linearly on the bottom portion 104.

As illustrated in FIG. 2, the bottom portion 104 has a housing 201 which may have an opening 202 therein. The opening 202 allows access to the interior of the housing 201. The housing may house electronics (not shown), such as a printed circuit board, and electrical components, such as a controller and other circuitry to operate component of the mobile device 100. The opening 202 allows a cable or any other connections, such as flexible printed circuit (FPC), to connect the electronics in the bottom portion 104 for electronically communications with electrical components external to the bottom portion 104. For example, the cable may connect the electronics of the bottom portion 104 with electrical components (not shown) of the top portion 102, such as the LCD display 106, through an opening 302 in a body 304 in the top portion 102. The opening 302 in the top portion body 304 is illustrated in FIGS. 3A, 3B, 4A and 4B. It should be understood that the openings 202, 302 need not only be limited to facilitation of electrical communications, but may be used for other purposes, including mechanical communications, other communications purposes or even for no communications at all. Further, it should be understood that the openings 202, 302 in the top and bottom portions 102, 104 need not be for allowing a cable access to the interiors of the top and bottom portions 102, 104, but the openings 202, 302 may be for any other purpose.

Figure 5:
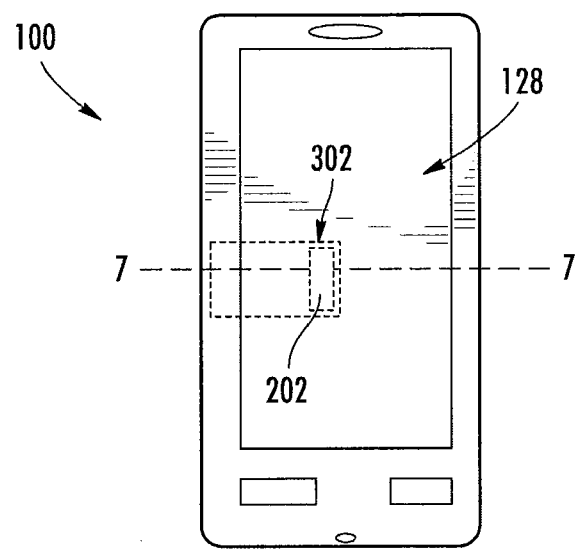
FIG. 5 is a front view of the mobile device of FIG. 1A.

As illustrated in FIGS. 4A-4B, the opening 302 in the top portion body 304 may overlap the opening 202 in the bottom portion housing 201 at any position of the top portion 102 relative to the bottom portion 104. For example, when the top portion 102 overlays the bottom portion 104 (as illustrated in FIG. 1), the mobile device is in the closed position, and as such, the openings 202 and 304 also overlap each other (as illustrated in FIG. 5). Also, as illustrated in FIGS. 4A-4B, when the top portion 102 has been slid or moved a distance relative to the bottom portion 104 so that only a portion of the top portion 102 overlaps the bottom portion 104, the mobile device 100 is considered to be in an open position and the openings 202 and 304 continue to overlap each other. The openings 202 and 304 also overlap each other while the top portion 102 is being slid or moved from the closed position to the open position. It should be understood that the openings 202 and 302 do not have to overlap each other. Additionally, it should be understood, that the present invention should not be limited to having more than one opening as only one opening may be sufficient, and, as one skilled in the art may understand, embodiments of the present invention need not have any openings at all for the present invention to properly operate.

FIG. 5 is a front view of the mobile device 100 of FIG. 1A. As shown, the opening 302 of the top portion 102 may be located at one side of the mobile device 100. However, it should be understood that the opening 302 may be located at any point in the body 304 of the top portion 102. Nonetheless, line 7-7 represents a plane which perpendicularly traverses through the mobile device 100, including the opening 302, at the position located as illustrated in FIG. 5.

Figure 6:
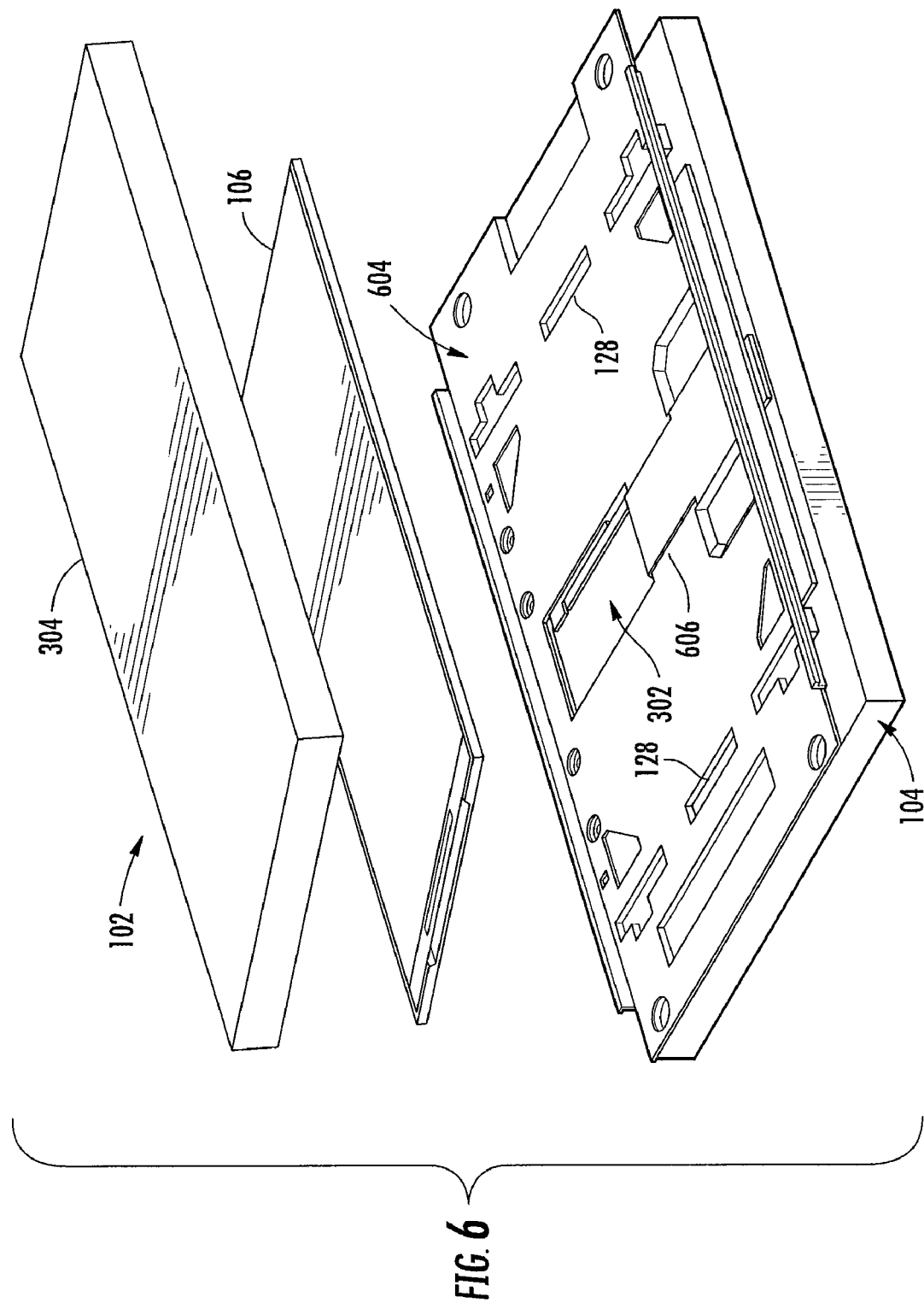
FIG. 6 is an exploded perspective view of the mobile device in accordance with some embodiments of the present invention.

FIG. 6 illustrates an exploded perspective view of the mobile device 100 of FIG. 1A. As shown in FIG. 6, the top portion 102 of the mobile device 100 includes the housing 304 that may house an LCD display 106 and a frame 604 to support the display 106. Also illustrated is the opening 302 in the housing 304 and a shutter door 606, which is discussed later with regards to FIGS. 7-11.

The bottom portion 104 and top portion 102 are moveably connected together via a movable connection system 128. The movable connection system 128 is adapted to allow the top portion 102 to slide relative to the bottom portion 104 a direction relative to the bottom portion 104. This also allows movement of the shutter door 606 to cover at least a portion of the opening 202 in the top portion 102, as illustrated and described in more depth later with regard to FIGS. 9-11.

Figure 7:
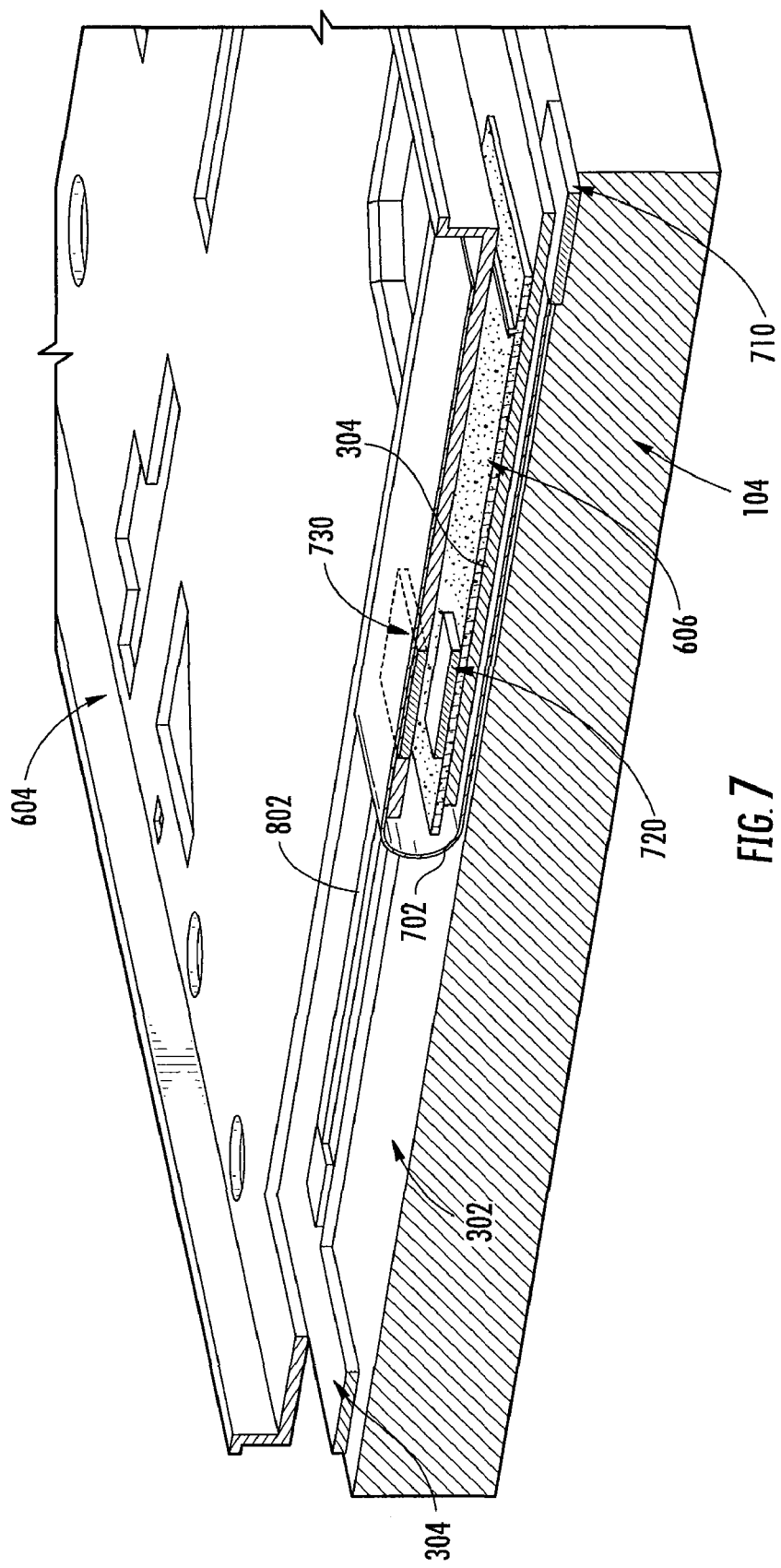
FIG. 7 is a cross-sectional view of the bottom portion and a part of the top portion of the mobile device of FIG. 5 taken along line 7-7.

FIG. 7 is a cross-sectional view of the bottom portion 104 and a part of the top portion 102 of the mobile device 100 of FIG. 5 taken along line 7-7. It should be noted that the LCD display 106 and the housing 302 above the LCD display 106 is not illustrated in FIG. 7 to better illustrate the structure of the shutter door 606 as well as to better illustrate operation of the shutter door 606.

As illustrated in FIG. 7, the opening 302 in the top portion 102 allows the cable 702 to the interior of the top portion 102. A first magnet member 710 is shown connected to the bottom portion 104. The first magnet member 710 may be fixedly connected at any location on the bottom portion 104, including close to an edge of the bottom portion 104. A second magnet member 720 is fixedly connected to the shutter door 606 so that the second magnet member 720 moves along with the shutter door 606. A third magnet member 730 is connected to the frame 604 which supports the LCD display 106 or other hardware in the top portion 102. It should be understood that any of the magnet members 710, 720, and 730 may be a magnet or any ferromagnetic or paramagnetic material which is attracted by a magnetic field, such as iron, steel, nickel, cobalt and the like. In one embodiment, the third magnet member 730 is an iron plate and the first and second magnet members are magnets. The magnetic force due to the interaction of the magnet members, 710, 720 and/or 730 facilitates movement of the shutter door 606 as is discussed in FIGS. 9-11.

Figure 8A:
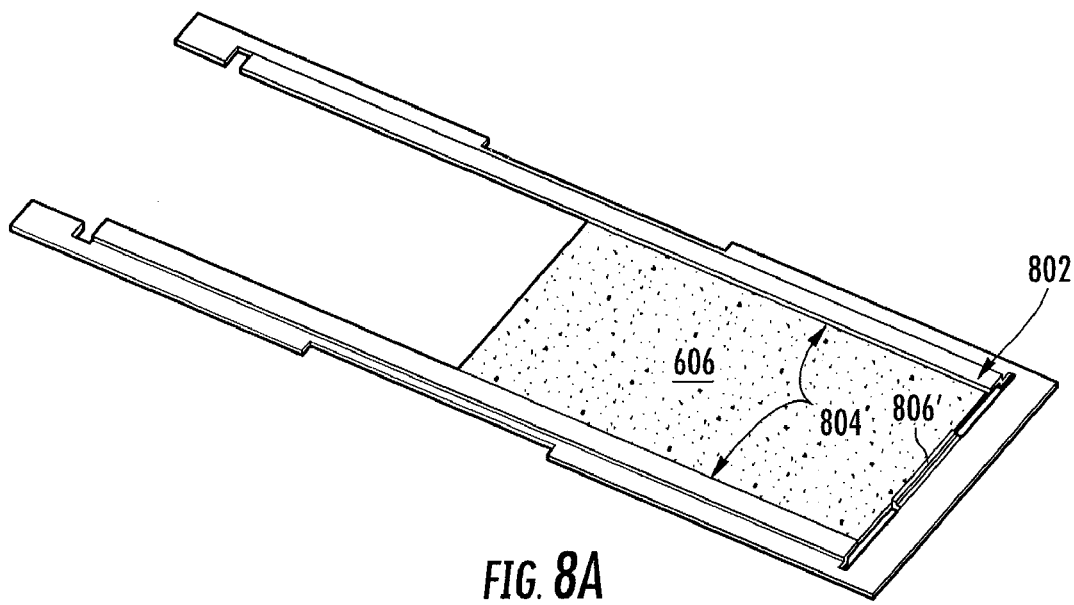
FIG. 8A is top perspective view of shutter door guides and a shutter door in the closed position in accordance with some embodiments of the present invention.
Figure 8B:
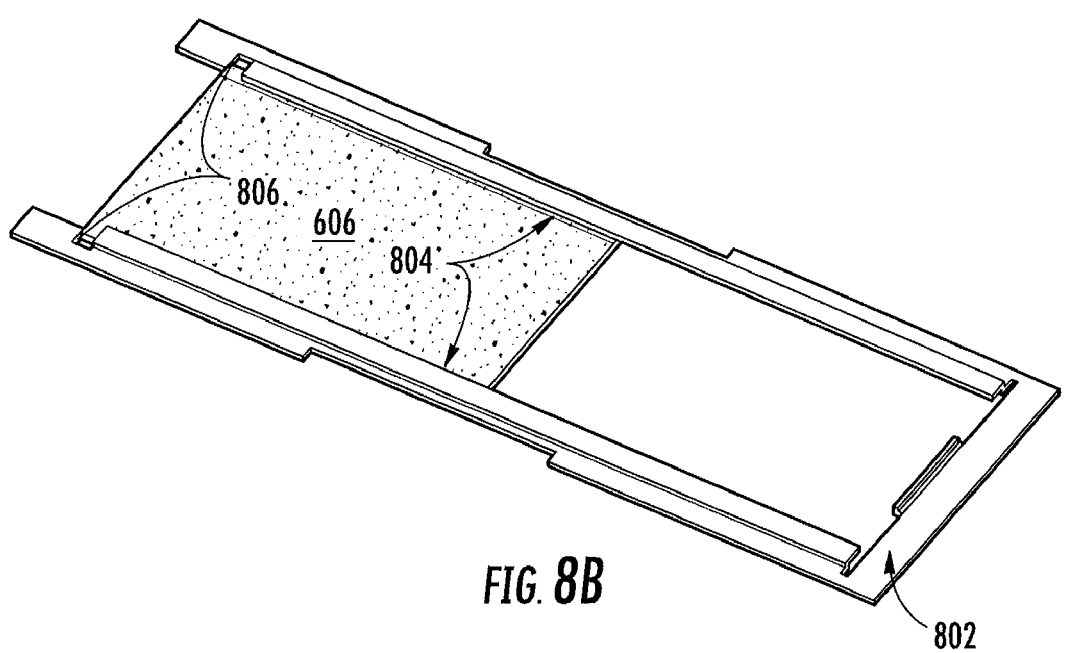
FIG. 8B is top perspective view of the shutter door guides and shutter door of FIG. 8A where the shutter door is in the open position.

FIGS. 8A and 8B are top perspective views of the shutter door 606 in accordance with some embodiments of the present invention. The shutter door 606 is guided via a shutter door frame 802. The shutter door frame 802 has shutter door guides 804 along which the shutter door 606 is allowed to slide between an open position and a closed position. The closed position of the shutter door 606 is illustrated in FIG. 8A and corresponds to the open position of the mobile device 100. The open position of the shutter door 606 is illustrated in FIG. 8B and corresponds to the closed position of the mobile device 100. The shutter door frame 802 includes door stoppers 806 to stop the movement of the shutter door 606 at either end of the shutter door frame 802.

Operation of the shutter door 606 will now be described. FIGS. 9A and 9B are a side perspective view and a front perspective view of a portion the mobile device 100 of FIG. 7. As illustrated, the mobile device 100 is in the closed position (i.e., the position illustrated in FIG. 1) and the shutter door 606 is in the open position (i.e., the position illustrated in FIG. 8A). The second magnet member 720 and the third magnet member 730 are aligned so as to create a magnetic force therebetween. In one embodiment, the distance between the second magnet member 720 and the third magnet member 730 is less than 50 mm, such as about 21 mm. It should be noted that no magnetic force may be present between the first magnet member 710 and the second magnet member 720 when the mobile device 100 is in the closed position. However, as the second magnet member 720 approaches the first magnet member 710 the magnetic force therebetween may increase, as is discussed later.

The magnetic force between the second magnet member 720 and the third magnet member 730 is enough so that when the LCD display frame 604 along with third magnet member 730 is moved, the shutter door 606 will overcome the frictional forces present in the shutter door frame 802 and thus, will slide along with the LCD display frame 604 to the position shown in FIG. 10A. As the second magnet member 720 approaches the first magnet member 710, the first magnet member 710 facilitates movement of the LCD display frame towards the position shown in FIG. 10A by creating a magnetic force with the second magnet member 720 that moves the second magnet member 720 towards the first magnet member 710.

FIGS. 10A and 10B are a side perspective view and a front perspective view of a portion the mobile device of FIG. 7 where the mobile device is in the process of being opened (i.e., in a partly open position). At this position, the top portion 102 has simply been shifted or been slid relative to the bottom portion 104. As such, the shutter door 606 is still in an open position. However, the third magnet member 730 has shifted and thus, aligned the second magnet member 720 with the first magnet member 710. The magnetic force between the first magnet member 710 and the second magnet member 720 is greater than the magnetic force between the second magnet member 720 and the third magnet member 730. In one embodiment, the magnetic force between the first magnet member 710 and the second magnet member 720 is approximately two times greater than the magnetic force between the second magnet member 720 and the third magnet member 730. Regardless, the force between the first magnet member 710 and the second magnet member 720 is great enough so that the second magnet member 720 will stay aligned with the first magnet member 710 when the third magnet member 730 is slid past the first magnet member 710 towards the position shown in FIG. 11A.

Figure 11B:
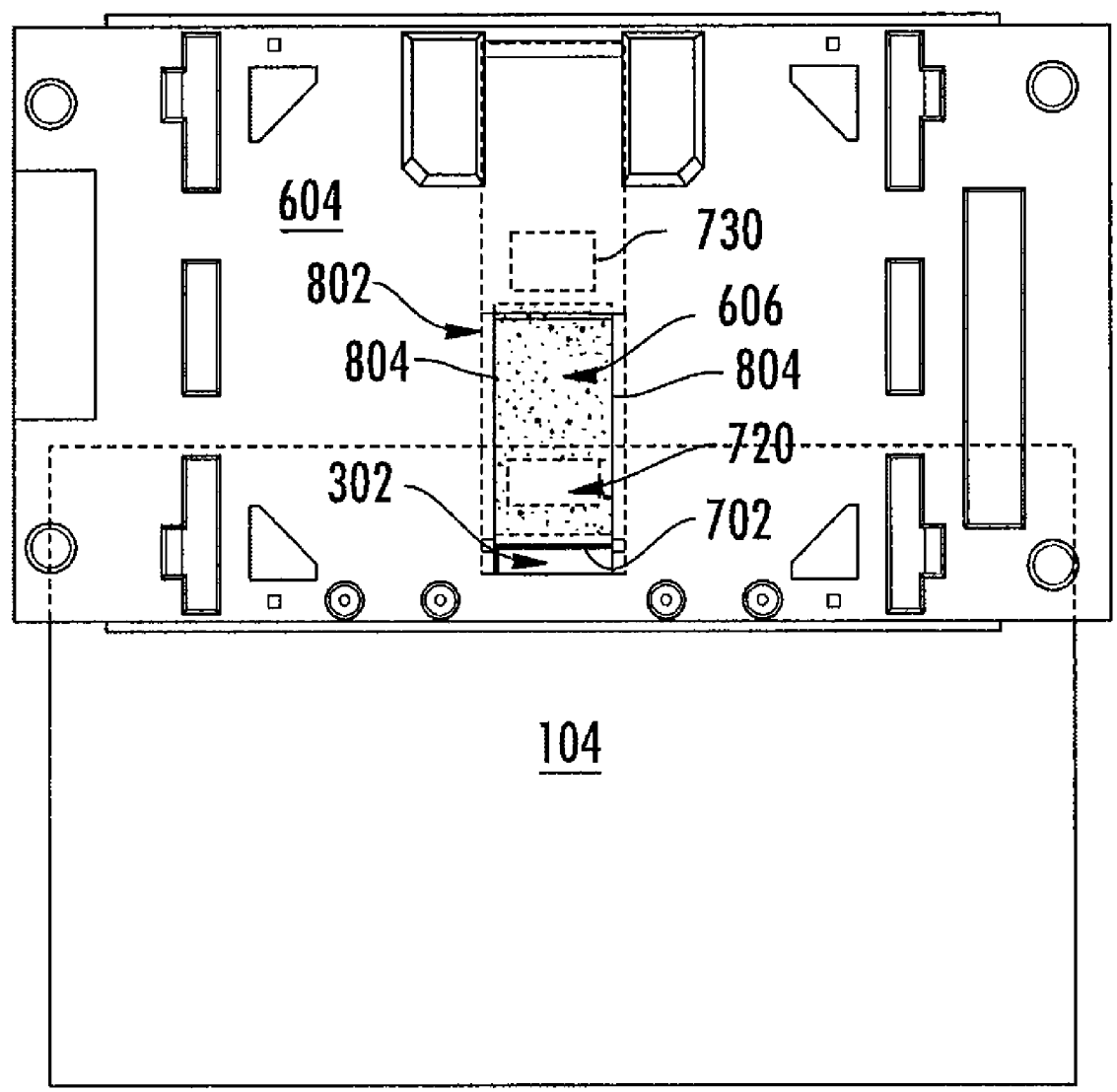
FIG. 11B is front perspective view of the mobile device of FIG. 11A.

When the top portion 102 is shifted so that the mobile device is in the fully open position, as illustrated in FIGS. 11A-B, the first magnet member 710 shifts the shutter door 606 from an open position (FIG. 8A) to a closed position (FIG. 8B). This happens because the shutter door frame 802 moves along with the top portion 102 but the first magnet member 710 does not allow the shutter door 606 to move along with the shutter door frame 802, thereby moving the shutter door 606 relative to the shutter door frame 802 to a closed position. When the shutter door 606 is in the closed position and the top portion 102 being moved into the fully open position, the shutter door 606 covers the opening 302 in the top portion 102, as illustrated in FIGS. 11A-B.

To return the mobile device 100 from the open position to the closed position, the top portion 102 is first moved back from the position illustrated in FIGS. 11A-B to the position illustrated in FIGS. 10A-B. From the position of FIGS. 10A-B, the top portion 102 is then moved to the position illustrated in FIGS. 9A-B and during such movement, the door stopper 806' abuts a portion of the shutter door 606 forcing the shutter door 606 to move from a closed position (FIG. 8A) to the open position (FIG. 8B) as the mobile device is moved back to the closed position (FIG. 9A-B).

The illustrations in the Figures illustrate the architecture, functionality, and operation of possible implementations of systems, methods and devices according to various embodiments of the present invention. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A mobile device, comprising:
   a first portion comprising a body and a first magnet member mounted to the body; and
   a second portion being movably connected with the first portion and comprising:
      a body defining an opening;
      a shutter door operable to move between an open position and a closed position, the shutter door covering at least a portion of the opening when the shutter door is in the closed position; and
      a second magnet member mounted on the shutter door so that a magnetic force is created between the second magnet member and the first magnet member when the first magnet member and second magnet member are aligned so as to allow for movement of the shutter door from the open position to the closed position.

2. The mobile device of claim 1, wherein the second portion further comprises a third magnet member, and wherein a magnetic force between the third magnet member and the second magnet member moves the second magnet member to align with the first magnet member.

3. The mobile device of claim 2, wherein the magnetic force between the second magnet member and the first magnet member, when the first magnet member and second magnet member are aligned, is less than the magnetic force between the second magnet member and the third magnet member when the second magnet member and third magnet member are aligned.

4. The mobile device of claim 1, wherein the second portion further comprises shutter door guides to guide the shutter door between the open position in the closed position.

5. The mobile device of claim 4, wherein the shutter door guides comprises at least one door stopper at an end of the shutter door guides, the at least one door stopper configured to move the shutter door from the closed position to the open position.

6. The mobile device of claim 1,
   further comprising an electrical cable connected between the first portion and the second portion through an opening in the body of the first portion and the opening in the body of the second portion,
   wherein the first portion further comprises electronics housed in the body of the first portion,
   wherein the second portion further comprises electronics housed in the body of the second portion, and
   wherein the electrical cable allows electrical communication between the electronics in the body of the first portion and the electronics in the body of the second portion.

7. The mobile device of claim 1, wherein any of the first magnet member and the second magnet member comprises one of a magnet or a magnetically attractable material.

8. The mobile device of claim 1, wherein the mobile device comprises a mobile cellular telecommunications device.

9. A method comprising:
   providing a mobile device comprising:
      a first portion comprising a body and a first magnet member; and
      a second portion comprising:
         a body defining an opening;
         a shutter door; and
         a second magnet member;
   moving the second portion from a first position to a second position relative to the first portion so that the shutter door moves from an open position to a closed position to cover at least a portion of the opening, the closed position being defined by the alignment of the first magnet member and second magnet member.

10. The method of claim 9, wherein the second portion further comprises a third magnet member attached to the body of the second portion, and wherein the second magnet member is attached to the shutter door so that the shutter door moves along with the second magnet member.

11. The method of claim 10, wherein the moving the second portion from the first position to the second position comprises:
   moving the second portion from the first position to a third position relative to the first portion, wherein the first position is defined by an alignment of the second magnet member and the third magnet member, and the third position is defined by an alignment of the first magnet member, the second magnet member and the third magnet member; and
   moving the first portion from the third position to the second position relative to the second portion.

12. The method of claim 9, further comprising moving the second portion from the second position to the first position relative to the first portion, wherein the second portion further comprises shutter door guides that guides movement of the shutter door from the open position to the closed position, the shutter door guides comprising a door stopper that moves the shutter door from the closed position to the open position when the second portion is moved from the second position back to the first position.

13. The method of claim 9, wherein the moving the second portion from the first position to the second position comprises moving the second magnet member toward the first magnet member so that the first magnet member and second magnet member are magnetically attracted to each other and eventually align with each other.

14. A mobile device, comprising:
a first portion comprising a body and a first magnet member mounted on the body; and
a second portion connected with the first portion and comprising:
 a housing defining a first opening;
 a shutter door operable to move from an open position to a closed position, the shutter door covering at least a portion of the opening when the shutter door is in the closed position; and
 a second magnet member that is magnetically attracted to the first magnet member when the shutter door is in the closed position.

15. The mobile device of claim 14, wherein the first portion defines a second opening, and wherein the first portion further comprises a display and the second portion further comprises electronics connected to the display via a cable, the cable extending from the electronics through the first opening and second opening and connecting to the display.

16. The mobile device of claim 14, wherein one or more of the first and second member comprises a one of a magnet or a magnetically attractive material.

17. The mobile device of claim 14, wherein the second portion further comprises a display and a third magnet member mounted to a frame for supporting the display such that the third magnet member is moved when the display is moved.

18. The mobile device of claim 17, wherein a magnetic force created between the first magnet member and the second magnet member when the first magnet member and the second magnet member are aligned is greater than a magnetic force created between the second magnet member and the third magnet member when the second magnet member and third magnet member are aligned.

19. The mobile device of claim 14, wherein the second portion further comprises shutter door guides to facilitate the movement of the shutter door, the shutter door guides comprising at least one door stopper to prevent the shutter door from moving past a location on the shutter door guides.

20. The mobile device of claim 14, wherein the second magnet member is mounted on the shutter door so that a magnetic force is created between the second magnet member and the first magnet member when the first magnet member and second magnet member are aligned so as to allow for movement of the shutter door from the open position to the closed position.

* * * * *